Patented Jan. 17, 1933

1,894,479

UNITED STATES PATENT OFFICE

WALTER BADER, OF SPONDON, NEAR DERBY, ENGLAND, ASSIGNOR TO CELANESE CORPORATION OF AMERICA, A CORPORATION OF DELAWARE

SAPONIFICATION OF ESTERS OF ORGANIC ACIDS

No Drawing. Original application filed September 27, 1926, Serial No. 138,116, and in Great Britain July 20, 1926. Divided and this application filed July 26, 1928. Serial No. 295,611.

This invention relates to the hydrolysis or saponification of esters of organic acids.

This application is a division of application S. No. 138,116 filed Sept. 27, 1926 and issued as Patent No. 1,864,643 on June 28, 1932.

In preparing free organic acids from their esters, it has been customary to perform the saponification in the presence of an excess of water, because, the reaction being reversible, a large mass of water favours the formation of free acid. If the organic acid is insoluble in water, its separation from the reaction mixture is easy, but in the case of the lower fatty acids which are soluble in water, the separation of the acid in concentrated form is a more difficult and expensive operation.

According to this invention, the saponification of esters of organic acids, and particularly of lower fatty acids which are soluble in water, especially methyl acetate, is performed in such manner as to produce the free acids in an anhydrous or concentrated condition. For this purpose the saponification is effected by heating the said esters with a saponifying agent in the presence of just the theoretical amount of water required for the reaction, a strong mineral acid, for example, phosphoric acid or sulphuric acid, being preferably used as saponifying agent.

In the case of methyl acetate, for example, the reaction results in the formation of acetic acid and dimethyl ether, according to the following equation:

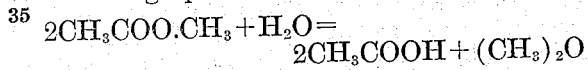

It is preferred to use phosphoric acid as saponifying agent, since it does not act as an oxidizing agent at the temperatures employed. The reaction takes place at temperatures between about 150° and about 300° C., temperatures between 180° and 220° C. being specially advantageous for the saponification of methyl acetate. For instance, at 200° C. the reaction proceeds rapidly, and results in substantially a quantitative yield of glacial acetic acid.

The more highly hydrated forms of phosphoric acid, for instance, ortho phosphoric acid and pyrophosphoric acid, are capable of supplying the water required for the saponification, being themselves at the same time dehydrated to the form of meta phosphoric acid. It is therefore possible to perform the reaction in a continuous manner, by continuously introducing supplies of ester and water in the requisite proportions into the phosphoric acid, the phosphoric acid serving in effect as a carrier for the water.

The reaction may be carried out in any apparatus designed for the interaction of gases and liquids, for example, wash towers, mixers, bubblers etc.

The saponification of methyl acetate, for example, may be carried out by passing it in the form of vapour together with the requisite quantity of steam, through a chamber containing phosphoric acid maintained at 180°–250° C.

The following examples will illustrate this method of saponification, but I do not restrict my invention to the particular methods hereinafter described.

Example 1

A closed copper vessel of high cylindrical shape, with a quick running agitator of the propeller type is nearly filled with phosphoric acid and kept by outside heating at 180°–220° C. The vapour of methyl acetate is introduced near the bottom of the vessel, and also the required amount of steam, while the top is connected to a condenser and receiver. The gas escaping from the receiver is pure methyl ether. The condensate is glacial acetic acid, with more or less unchanged methyl acetate, which is easily distilled off.

Example 2

A wash tower, containing copper plates arranged in the usual manner, is heated to 180–200° C. and phosphoric acid is run through it from top to bottom. The acid is circulated back to the top by a steam jet, the steam thus introduced acting as a hydrating agent. Methyl acetate vapour is led up the tower in counter current to the hydrated phosphoric acid. The products are the same as in Example 1.

The saponification processes herein described can also be applied to ethyl acetate methyl propionate, and other esters or organic acids.

What I claim and desire to secure by Letters Patent is:—

1. A process for producing a concentrated organic acid, which comprises saponifying an ester thereof in the presence of an acid saponifying agent by means of a quantity of water not substantially greater than one molecule of water for each ester group to be saponified.

2. A process for producing a concentrated lower fatty acid, which comprises saponifying an ester thereof in the presence of an acid saponifying agent by means of a quantity of water not substantially greater than one molecule of water for each ester group to be saponified.

3. A process for producing concentrated acetic acid, which comprises saponifying an ester thereof in the presence of an acid saponifying agent by means of a quantity of water not substantially greater than one molecule of water for each ester group to be saponified.

4. A process for producing a concentrated organic acid, which comprises heating an ester thereof with an acid saponifying agent, in the presence of a quantity of water which is not substantially greater than one molecule of water for each ester group to be saponified.

5. A process for producing concentrated acetic acid, which comprises heating an ester thereof with an acid saponifying agent in the presence of a quantity of water which is not substantially greater than one molecule of water for each ester group to be saponified.

6. A process for producing a concentrated organic acid in the free state, which comprises heating an ester thereof with a strong mineral acid in the presence of a quantity of water which is not substantially greater than one molecule of water for each ester group to be saponified.

7. A process for producing a concentrated organic acid in the free state, which comprises heating an ester thereof with a phosphoric acid in the presence of a quantity of water which is not substantially greater than one molecule of water for each ester group to be saponified.

8. A process for producing a concentrated lower fatty acid in the free state, which comprises heating an ester thereof with a strong mineral acid in the presence of a quantity of water which is not substantially greater than one molecule of water for each ester group to be saponified.

9. A process for producing concentrated acetic acid in the free state, which comprises heating an ester thereof with a phosphoric acid in the presence of a quantity of water which is not substantially greater than one molecule of water for each ester group to be saponified.

10. A process for saponifying an ester of an organic acid, which comprises splitting it into the corresponding ether and acid by means of an acid saponifying agent and substantially the quantity of water which is theoretically necessary for the production of the ether and the anhydrous acid.

11. A process for saponifying an ester of a lower fatty acid, which comprises splitting it into the corresponding ether and acid by means of an acid saponifying agent and substantially the quantity of water which is theoretically necessary for the production of the ether and the anhydrous acid.

12. A process for saponifying methyl acetate, which comprises splitting it into dimethyl ether and acetic acid by means of an acid saponifying agent and substantially the quantity of water which is theoretically necessary for the production of dimethyl ether and anhydrous acetic acid.

13. A process for saponifying an ester for the production of a lower fatty acid and an ether, one at least of said products being volatile at temperatures below 300° C., which comprises saponifying the ester in the presence of a strong mineral acid by means of substantially the quantity of water which is theoretically necessary for the production of the ether and the anhydrous acid, and simultaneously vaporizing at least one of the products of saponification.

14. A process for saponifying an ester for the production of a lower fatty acid and an ether, one at least of said products being volatile at temperatures below 300° C., which comprises saponifying the ester in the presence of phosphoric acid by means of substantially the quantity of water which is theoretically necessary for the production of the ether and the anhydrous acid, and simultaneously vaporizing at least one of the products of saponification.

15. A process for the production of dimethyl ether and acetic acid, which comprises saponifying methyl acetate in the presence of phosphoric acid by means of substantially the quantity of water which is theoretically necessary for the production of dimethyl ether and anhydrous acetic acid, and simultaneously vaporizing the products of saponification.

16. A process for saponifying an ester of an organic acid, which comprises heating the ester with a phosphoric acid in which the ratio of water to phosphoric oxide is greater than that in metaphosphoric acid, separating the products of saponification from the dehydrated phosphoric acid, and re-hydrating the phosphoric acid for reuse in the saponification process.

17. A process for producing dimethyl ether and concentrated acetic acid, which comprises heating methyl acetate with a phosphoric acid in which the ratio of water to phosphoric oxide is greater than that in metaphosphoric acid, separating the products of saponification from the dehydrated phosphoric acid, and re-hydrating the phosphoric acid for re-use in the saponification process.

18. A process for saponifying methyl acetate, which comprises bringing its vapour into contact with phosphoric acid maintained at 180°–220° C., in the presence of substantially the quantity of steam theoretically necessary to convert the methyl acetate into dimethyl ether and acetic acid.

19. A process for saponifying methyl acetate, which comprises passing its vapour in counter-current in contact with phosphoric acid at 180°–220° C., the phosphoric acid being circulated and maintained in a hydrated form by means of substantially the quantity of steam theoretically requisite for the production of dimethyl ether and acetic acid.

20. A process for saponifying an ester of an organic acid, which comprises heating the ester with at least one of the more highly hydrated forms of phosphoric acid.

21. A process for saponifying an ester of a lower fatty acid, which comprises heating the ester with ortho phosphoric acid.

In testimony whereof I have hereunto subscribed my name.

WALTER BADER.